United States Patent [19]

Vigerstrom

[11] 3,997,678
[45] Dec. 14, 1976

[54] PASSING AN ELECTRIC CURRENT OF 50-60 CPS THROUGH POTATO PIECES DURING BLANCHING

[75] Inventor: Knut Birger Vigerstrom, Stockholm, Sweden

[73] Assignee: Electro-Food AB, Stockholm, Sweden

[22] Filed: Nov. 24, 1975

[21] Appl. No.: 634,757

Related U.S. Application Data

[63] Continuation-in-part of Ser. No. 399,493, Sept. 21, 1973, abandoned, which is a continuation of Ser. No. 146,846, May 25, 1971, abandoned.

[30] Foreign Application Priority Data

May 28, 1970 Sweden .............................. 7368/70

[52] U.S. Cl. .............................. 426/244; 426/441; 426/509
[51] Int. Cl.² .......................................... A21D 6/00
[58] Field of Search .......... 426/244, 637, 438, 441, 426/508, 509

[56] References Cited

UNITED STATES PATENTS

| | | | |
|---|---|---|---|
| 1,961,681 | 6/1934 | Bohart | 426/234 |
| 2,569,075 | 9/1951 | Schade | 426/244 |
| 3,044,880 | 7/1962 | Bogyo | 426/438 |
| 3,230,096 | 1/1966 | Lavine | 426/244 |

OTHER PUBLICATIONS

*Potato Processing*, Tolburt and Smith 2nd ed. pp. 351–353, Aui. Publishing Co. Westport Conn. 1967.

*Primary Examiner*—Norman Yudkoff
*Assistant Examiner*—Martin G. Mullen
*Attorney, Agent, or Firm*—Cushman, Darby & Cushman

[57] ABSTRACT

In the process of preparing deep-fried potato products such as chips or French fries, the conventional blanching step comprising washing and pre-heating before the actual cooking in oil is replaced by novel blanching step. In this process step, the cut potato products are submersed in water and subjected to the passage of electric current of 50–60 cycles per second supplied to the water bath by means of electrodes immersed therein, during which treatment the potato products are heated to a suitable high temperature such as the boiling point.

4 Claims, No Drawings

PASSING AN ELECTRIC CURRENT OF 50-60 CPS THROUGH POTATO PIECES DURING BLANCHING

CROSS-REFERENCE TO RELATED APPLICATIONS

This is a continuation-in-part of U.S. application Ser. No. 399,493, filed Sept. 21, 1973, which, in turn, is a Rule 60 continuation application of Ser. No. 146,846, filed May 25, 1971, both of which applications are now abandoned.

The present invention relates to preparing deep-fried potato products such as chips and French fries. The preparation of such products has hitherto usually comprised the following steps:

1. Washing and/or rinsing of raw potatoes
2. Sorting according to size, weight or form
3. Possible peeling
4. Cutting up or shaping
5. Blanching: washing, treating for attainment of resistance to discoloration, possibly in connection with precooking
6. Deep-frying
7. Drying
8. Packaging In the deep-frying step, 6, the product is allowed to pass through a bath of melted fat or oil which is kept at a temperature higher than the evaporating point of the fluid in the product, usually water. During deep-frying, the fluid in the product evaporates more or less completely, depending on how long the deep-frying lasts. Thus, during deep-frying, the finished product is prepared — i.e. the proteins are coagulated, water evaporates or is absorbed, fat is broken down, starch becomes thicker and any sugar is converted. Deep-frying is therefore decisive for determining the taste, nutritional value, consistency and appearance (color and surface structure) of the product.

In order to attain the best results when deep-frying, the immediately preceding step, 5, for pretreating the products is quite essential. This pretreatment, usually called "blanching", is conventionally carried out in a way such that slices or strips of potatoes are washed to remove starch grain and sugar lying on the surface. A degree of heating up occurs thus lessening the time required for subsequent deep-frying. In addition, additives are used during washing to cut down discoloring which arises during the drying due to the conversion of the starch to reduce sugar. Also, starchy products such as potatoes often stick together during deep-frying because of gelation of the free starch grains. This sticking together is undesirable since the products thereby lump together during deep-frying. Thus, the preparatory washing of the products is essential. However, known to date methods fail to provide fully satisfactory results. The pretreatment before deep-frying is effected conventionally in a water bath, possibly mechanically to a certain degree. Different temperatures can be used; higher temperatures generally provide better preparatory results but also certain disadvantages in the subsequent deep-frying — e.g. oil absorption in the product increases, etc.

The intention of the invention is to improve upon the treatment, partly to give the potato products a better appearance, taste, consistency and nutritional value and partly to shorten the treatment period.

This is achieved according to the invention in that during the pretreatment step the potato products are heated by passing electric current directly therethrough with the aid of current supply electrodes arranged in the water.

When deep-frying sliced potatoes, a surprising improvement in the treatment results were noted with the application of the procedure according to the invention. The color has improved, especially its uniformity over the entire product surface and blistering was decreased. Prepared potato chips are crispier compared with chips conventionally treated. If pretreatment is carried out in accordance with the invention, sticking together of the potato slices during deep-frying is completely eliminated. The time required in the deep-frying bath is cut by 10 to 50%. With the process according to the invention, taste, smell and nutritional value will be better than with the conventional treatment. Moreover, the water content of the finished product is somewhat lower with the present process than with conventional procedures so that, inter alia, the shelf life of the product is improved.

When treating sliced potatoes, e.g. for making chips or French fries, the potato products are preferably subjected to an AC field of 0.2 – 20 volts/mm, most preferably of about 1.5 volts/mm in a water bath. A common mains voltage can suitably be used, i.e. a frequency of 50 – 60 c.p.s.

The advantages of the pretreatment step according to the invention is the removal of water and fat from the product. Because of the direct passage of current during pretreatment, an even distribution of temperature is obtained in the product so that the breaking down of enzymes right through the product is optimized. Temperatures which are equally high in the center and on the surface of the product can be quickly attained so that sterilization is accomplished without the risk of damaging the surface of the product.

EXPERIMENTS

Blanching is frequently used in potato processing in order to improve the quality of the products, especially the color. This investigation was carried out at the Department of Plant Husbandry at the Agricultural College of Sweden and sponsored by the Electro Food Company, Stockholm to compare common water blanching and blanching according to electrical treatment. The effects of different treatments of slices and strips on fresh weight, dry matter content, yields, oil content, and color of the finished products were studied in a series of experiments. Methods and Material The blanching process was performed in a specially made apparatus in which the blanching water was contained in a trough in which the electrodes were inserted. The temperature of the water could be varied as well as the electrical current. In the electrical current treatment on alternating electrical current was put through the water; said treatment is in some instances referred to as the OSCO method.

The determination of the dry matter was made by drying the samples at 105° C for 24 hours.

The frying was made in peanut oil at a mean temperature of 170° C.

The quality of the chips and French fries was judged according to scales recommended by the European Association for Potato Research.

The potato tubers were from the cultivar Bintje and stored at 5° C. The samples of potatoes were chosen to be of relatively uniform quality. Experiments on Potato Chips Experiment 1.

This experiment was undertaken to find out the effects of the treatments on the properties of the potato chips. The results are presented in Table 1.

Table 1.

Effect of blanching and electrical treatment on the quality of potato chips.
A = Electrical treatment
B = Blanching

| Time, seconds | 12° C A | B | 48° C A | B | 80° C A | B |
|---|---|---|---|---|---|---|
| CHIP COLOR, 1 = dark, 10 = white | | | | | | |
| 60 | 3.6 | 3.0 | 2.4 | 2.0 | 4.6 | 4.2 |
| 120 | 3.8 | 3.2 | 2.2 | 1.3 | 5.1 | 4.3 |
| 180 | 4.6 | 3.7 | 3.1 | 1.0 | 5.0 | 4.8 |
| Average | 4.0 | 3.3 | 2.6 | 1.4 | 4.9 | 4.3 |
| BLISTERS, per cent of surface area | | | | | | |
| 60 | 4.0 | 5.0 | 11.5 | 10.0 | 7.5 | 13.0 |
| 120 | 5.0 | 9.0 | 10.0 | 19.0 | 9.5 | 12.5 |
| 180 | 7.5 | 8.0 | 13.5 | 22.0 | 3.0 | 10.4 |
| Average | 5.5 | 7.3 | 11.7 | 17.0 | 6.7 | 11.3 |
| OILINESS, relative frequencies in class low oiliness | | | | | | |
| 60 | 70 | 50 | 0 | 0 | 0 | 30 |
| 120 | 60 | 40 | 50 | 50 | 10 | 20 |
| 180 | 0 | 60 | 60 | 0 | 30 | 40 |
| Average | 43 | 50 | 33 | 27 | 13 | 30 |
| CRISPINESS, relative frequences in class acceptable | | | | | | |
| 60 | 100 | 100 | 100 | 100 | 80 | 40 |
| 120 | 90 | 70 | 100 | 100 | 80 | 60 |
| 180 | 70 | 100 | 100 | 100 | 90 | 80 |
| Average | 86 | 90 | 100 | 100 | 83 | 60 |
| Ampere | 1.75 | | 4.25 | | 6.75 | |

As can be seen in the Table the two methods were compared at three temperatures of the blanching water and at three different blanching times. It is also shown that the amperages varied with the temperature of the water. The results are that the color of chips is lighter when the electrical treatment was used and also that the blistering was decreased by using electrical treatment of the slices. There is a tendency toward increased oiliness noted when using the electrical treatment. The differences in crispiness are very small between the two treatments.

Experiment 2.

The purpose was to study the effect of the treatments on the dry matter content of the slices. The following conditions were employed.

Time of treatment: 120 sec.
Temperature of the water: 48° C
Voltage: 120 V
The results are given in Table 2.

Table 2.

Influence of blanching and electrical treatment on the dry matter content of potato slices.

| Treatment | Dry matter, % |
|---|---|
| Control | 18.5 |
| Common blanching | 17.2 |
| Electrical treatment | 18.7 |

As can be seen in Table 2 the known step of blanching in water decreased the dry matter content. The electrical treatment seemed to result in increased dry matter content of the slices. The dry matter content in percent of fresh weight after blanching is given in Table 2A.

Table 2A.

Influence of blanching on the dry matter content of potato slices.

| Treatment | Dry matter, % |
|---|---|
| Control | 19.4 |
| Water | 18.0 |
| OSCO, 1A | 18.5 |
| OSCO, 4A | 19.9 |
| OSCO, 7A | 19.4 |

As can be seen in the Table the blanching has not increased the dry matter percentage as compared with the control, which means that not only water but also dry matter left the slices. This loss of dry matter can be calculated and the results are given in Table 2B as loss of dry matter in per cent of the dry matter content in the control.

Table 2B.

Loss of dry matter by blanching.

| Treatment | Dry matter loss, % |
|---|---|
| Control | 0 |
| Water | 6 |
| OSCO, 1A | 7 |
| OSCO, 4A | 7 |
| OSCO, 7A | 12 |

Blanching always gives loss of dry matter and in this experiment normal blanching and OSCO-blanching at 1 and 4 ampere gave the same loss while the dry matter loss increased when the strength of the current was increased to 7 ampere. The tendency is the same in all the experiments even if the absolute values vary. Therefore it can be concluded that OSCO-blanching decreases the fresh weight of the slices or strips more than normal blanching in water and that an increase in current strength increases the dry matter losses. The effect of OSCO-blanching also seems to depend on the quotient water/slices as can be seen in Table 11B.

Experiment 3.

The purpose was the same as for Experiment 2 but the temperature of the blanching water was varied. The following experimental conditions were employed.

Time of treatment: 120 sec.
Temperature of the water: 12°, 48° and 83° C
Voltage: 120 V
Amperage at the temperatures, respectively: 1.5, 4.5 and 8.0 A
The results are given in Table 3.

Table 3.

Effect of blanching and electrical treatment of slices on the fresh weight and the content of dry matter.

| Treatment | Fresh weight, g before | after | Difference g | % | Dry matter % |
|---|---|---|---|---|---|
| 12° C | | | | | |
| Control | — | — | — | — | 19.70 |
| Electrical | 35.45 | 35.78 | +0.33 | + 0.9 | 18.49 |
| Common | 36.20 | 36.88 | +0.68 | + 1.9 | 18.60 |
| 48° C | | | | | |
| Control | — | — | — | — | 20.10 |
| Electrical | 32.30 | 29.02 | −3.37 | −10.0 | 19.16 |
| Common | 30.94 | 31.88 | +0.94 | + 3.0 | 18.30 |
| 83° C | | | | | |
| Control | — | — | — | — | 20.21 |
| Electrical | 39.81 | 37.84 | −1.97 | − 5.2 | 18.20 |
| Common | 39.74 | 37.84 | +1.90 | + 4.8 | 17.89 |

As can be seen in Table 3 the dry matter content decreased by the treatments. The known blanching technique decreased the dry matter content more than the electrical treatment except at the lowest temperature.

By means of the results presented in Table 3 it is also possible to estimate the decrease in dry matter for the different treatments. Using the dry matter content of the control, the content of dry matter of the slices before blanching can be calculated and using the dry matter percentage after blanching it is thus possible to calculate the dry matter content after blanching. The difference between the dry matter content before and after treatment is given in Table 4 as percent of the amount of dry matter before treatment.

Table 3A.

Influence of blanching as the fresh weight of slices.
Temperature of blanching water, 40° C.
Time of blanching, 120 Seconds.

| Treatment | Change in fresh weight, per cent |
|---|---|
| Water | +1 |
| OSCO, 1A | −2 |
| OSCO, 4A | −9 |
| OSCO, 7A | −11 |

As can be seen in Table 3A the usual blanching caused a slight increase in the fresh weight of the slices while the OSCO-blanching markedly decreased the fresh weight. The changes in fresh weight can be caused by uptake or loss of water or loss of dry matter substances. If the slices only lose water then the dry matter content in percent must increase and this is also the case if more water than dry matter is lost. Uptake of water alone, or combined with dry matter loss, decreases the dry matter percentage.

Table 4.

Changes in dry matter content caused by blanching and electrical treatment.

| Temperature, °C | Treatment | Decrease in dry matter content, % |
|---|---|---|
| 12 | Common | 3.8 |
|  | Electrical | 5.3 |
| 48 | Common | 6.3 |
|  | Electrical | 14.4 |
| 83 | Common | 15.7 |
|  | Electrical | 14.4 |

As can be seen in Table 4 the blanching caused a loss of dry matter of the slices. The losses increased with higher temperatures. Using low temperatures the loss is higher for the electrical treatment but at the highest temperature the difference is small. It must be observed that the time for treatment is the same for the two treatments.

Experiment 4.

The purpose was to investigate the yield of chips and the oil content of the chips after blanching and electrical treatment of the slices before frying. The same experimental plan was used as in experiment 3 except that the temperature of the blanching water was not varied but maintained at 48° C. The results are given in Table 5.

Table 5.

Effect of blanching and electrical treatment on the yield and quality of potato chips.

| Treatment | Difference in fresh weight before and after treatment g | % | Yield % | Oil content % | Color |
|---|---|---|---|---|---|
| Control | — | — | 36 | 31 | 1 |
| Electrical | −12.9 | −8.9 | 39 | 40 | 3 |
| Common | 8.7 | 5.2 | 35 | 42 | 1 |

As can be seen in Table 5 the slices electrically treated decreased in fresh weight while the slices blanched according to conventional methods increased in fresh weight. Improved quality of chips and improved yields were obtained by electrical treatment as compared to the conventional blanching step.

Experiment 5.

The purpose was to investigate the effect of blanching and electrical treatment of slices at different temperatures and amperages. The following experimental plan was used.

Time of treatment: 120 sec.
Temperature of the water: 15° and 40° C
Amperages: 1, 4 and 7 A
The results are given in Table 6.

Table 6.

Effect of blanching and electrical treatment on fresh weight and dry matter content of potato slices.

| Treatment | Fresh weight, g before | after | Difference g | % | Dry matter % |
|---|---|---|---|---|---|
| 40° C |  |  |  |  |  |
| Control | 21.3 | — | — | — | 19.4 |
| Common | 21.2 | 21.5 | 0.3 | 1.3 | 18.0 |
| Electrical, 1 A | 19.2 | 18.8 | −0.4 | −1.9 | 18.5 |
| Electrical, 4 A | 23.3 | 21.2 | −2.1 | −8.9 | 19.9 |
| Electrical, 7 A | 20.8 | 18.5 | −2.3 | −11.2 | 19.3 |
| 15° C |  |  |  |  |  |
| Control | 23.7 | — | — | — | 20.6 |
| Common | 24.4 | 24.8 | 0.4 | 1.4 | 19.0 |
| Electrical, 1 A | 23.7 | 24.0 | 0.3 | 1.4 | 19.1 |
| Electrical, 4 A | 23.1 | 22.6 | −0.5 | −2.0 | 19.3 |

Table 7.

Changes in dry matter content after different treatments of the potato slices.

| Treatment | Loss of dry matter, % 15° C | 40° C |
|---|---|---|
| Common | 6.6 | 6.0 |
| Electrical, 1 A | 5.8 | 6.8 |
| Electrical, 4 A | 8.1 | 7.0 |
| Electrical, 7 A | & — | 11.7 |

As can be seen in Table 6 the slices treated electrically decreased in fresh weight with one exception, low temperature and only 1 ampere. The weight loss depends not only upon loss of water but also of dry matter, which is shown in Table 7. Increased amperage seemed to increase the loss of dry matter as can be seen in Table 7.

Experiment 6.

The purpose was to compare tubers from different cultivars. The treatment was made at 40° C during 120 seconds and at the electrical treatment the amperage was 4 amperes. The results are given in Table 8.

Table 8.

Effect of blanching on fresh weight and dry matter content of slices from different cultivars.

| Cultivar | Treatment | Fresh weight, g before | Fresh weight, g after | Difference g | Difference % | Dry matter |
|---|---|---|---|---|---|---|
| Bintje | Control | 21.1 | — | — | — | 18.1 |
|  | Common | 21.2 | 21.9 | 0.7 | 3.4 | 16.8 |
|  | Electrical | 21.2 | 20.7 | −0.5 | −2.4 | 17.3 |
| Woudster | Control | 15.5 | — | — | — | 23.8 |
|  | Common | 14.9 | 15.3 | 0.3 | 2.8 | 22.8 |
|  | Electrical | 15.1 | 14.9 | −0.3 | −1.7 | 22.6 |
| King Edward VII | Control | 18.6 | — | — | — | 19.9 |
|  | Common | 18.7 | 19.1 | 0.5 | 2.6 | 19.1 |
|  | Electrical | 17.7 | 17.6 | −0.2 | −0.8 | 19.2 |
| Up to date | Control | 23.9 | — | — | — | 18.4 |
|  | Common | 24.2 | 24.9 | 0.8 | 3.1 | 17.2 |
|  | Electrical | 23.0 | 22.4 | −0.7 | −3.0 | 17.9 |

As can be seen in Table 8 the cultivars reacted in the same way and the decrease in fresh weight at the electrical treatment is very much the same for all.

The loss of dry matter was calculated and the results are given in Table 9.

Table 9.

Effect of blanching and electrical treatment on the dry matter loss.

| Cultivar | Dry matter loss, % common | Dry matter loss, % electrical |
|---|---|---|
| Bintje | 4.0 | 6.6 |
| Woudster | 1.9 | 6.4 |
| King Edward VII | 1.4 | 4.3 |
| Up to date | 3.7 | 5.5 |

As can be seen in Table 9 the loss of dry matter is higher with the electrical treatment of the slices.

Using the same experimental plan as mentioned before also slices from the 4 cultivars were fried. The results of the analyses are given in Table 10.

Table 10.

Yield and quality of potato chips from different cultivars after blanching and electrical treatment.

| Cultivar | Yield, % A | Yield, % B | Yield, % C | Color A | Color B | Color C | Blisters, % of surface A | Blisters, % of surface B | Blisters, % of surface C |
|---|---|---|---|---|---|---|---|---|---|
| Bintje | 38 | 38 | 38 | 5 | 4 | 5 | 7 | 3 | 2 |
| Woudster | 46 | 46 | 45 | 7 | 7 | 6 | 3 | 0 | 0 |
| King Edward VII | 38 | 39 | 40 | 5 | 5 | 7 | 7 | 3 | 2 |
| Up to date | 38 | 38 | 38 | 2 | 3 | 4 | 8 | 8 | 2 |

A = Control
B = Common
C = Electrical

The yield calculated on the weight of the slices after blanching and electrical treatment.

Using the method of calculating the yield mentioned above no difference could be shown between the treatments. The color was improved by the treatments only for two cultivars. The blisters were reduced by the blanching and the electrical treatment.

Among other things the blanching has an effect on the sugar content which means that an improvement of color can be expected. Some results from rating the color of chips and French fries are given in Table 10A. The rating has been carried out according to the E.A.P.R. scale.

Table 10A.

Color of chips and French fries.

| Temperature, °C | Control | OSCO | Water |
|---|---|---|---|
| | Chips, | color | |
| 12 | 1 | 4 | 3 |
| 48 | 1 | 3 | 1 |
| 80 | 1 | 5 | 4 |
| | French fries, | color | |
| 40 | 1 | 4 | 3 |
| 70 | 1 | 6 | 5 |

In spite of the fact that the raw material was very poor owing to long storage at 5° C, blanching, and especially OSCO-blanching, improved the color so much that it could be commercially acceptable.

Experiment 7.

The purpose was to investigate if the quotient water/slices affected the results of the treatments. In the experiment three sizes of samples were used, 10, 50 and 100 g. The results are given in Table 11.

Table 11.

Effect of electrical treatment on fresh weight and dry matter content of potato slices.

| Treatment | Fresh weight, g before | Fresh weight, g after | Difference g | Difference % | Dry matter % |
|---|---|---|---|---|---|
| Control | 10.0 | — | — | — | 17.0 |
| Electrical | 10.0 | 9.3 | −0.8 | −7.5 | 16.2 |
| Control | 50.0 | — | — | — | 18.6 |
| Electrical | 50.0 | 43.7 | −6.3 | −12.6 | 18.3 |
| Control | 100.0 | — | — | — | 18.6 |
| Electrical | 100.0 | 81.4 | −18.6 | −18.6 | 18.5 |

As can be seen in Table 11 the decrease in fresh weight increases with increased size of the sample, which shows that the quotient water/slices is an important factor. The change in dry matter content is smaller the larger the sample.

Table 11A.

Influence of the quotient water/slices on the fresh weight of slices.

| Weight of slices, g. | Decrease in fresh weight, per cent |
|---|---|
| 10 | 9 |
| 50 | 13 |
| 100 | 19 |

As can be seen in the Table the decrease in fresh weight is larger when the weight of the samples is increased.

SUMMARY

The experiments with slices treated in different ways have shown that the common blanching in water as a rule increases the fresh weight of the samples and that the dry matter content in percent is lowered compared with the untreated slices. The electrical treatment mostly decreases the fresh weight of the sample and also decreases the dry matter percentages of the slices but not to the same extent as common blanching. The electrical treatment therefore must take away water from the slices and also substances found in the dry matter content. The effect of the electrical treatment can be varied by varying among other things the temperature of the water, the voltage, the amperage and the quotient water/slices.

Experiments on French Fries

Experiment 8.

The purpose was to investigate the effect of blanching and electrical treatments on strips for French fries. The following experimental conditions were employed.

Time of treatment: 60, 120 and 240 sec.
Amperage: 1, 4 and 7 A
Number of combinations: 27
Number of samples per combination: 2
Weight of sample: 40 g
The results are given in Table 12.

Table 12.

Effect of blanching and electrical treatment of potato strips on fresh weight and dry matter content.

| Time sec. | Amperes | Temperature, °C | Changes in fresh weight, % common | electrical | Changes in dry matter, per cent units common | electrical |
|---|---|---|---|---|---|---|
| 60 | 1 | 15 | −0.1 | −1.2 | 0.7 | 0.1 |
|  |  | 40 | −0.2 | −0.9 | −0.1 | 0.0 |
|  |  | 80 | −1.9 | −2.1 | −0.8 | 0.0 |
|  | 4 | 15 | −0.5 | −1.2 | −1.0 | −1.2 |
|  |  | 40 | −0.3 | −1.9 | −1.1 | 0.2 |
|  |  | 80 | −2.3 | −3.5 | −0.1 | 0.4 |
|  | 7 | 15 | −0.3 | — | −0.3 | — |
|  |  | 40 | −0.3 | −2.3 | −0.7 | 0.3 |
|  |  | 80 | −2.7 | −2.8 | 0.0 | −0.6 |
| 120 | 1 | 15 | 0.7 | −1.0 | −1.0 | −0.6 |
|  |  | 40 | −1.0 | −2.5 | −0.9 | 0.2 |
|  |  | 80 | −3.4 | −3.4 | −0.9 | −0.5 |
|  | 4 | 15 | −1.6 | −3.3 | −0.2 | 0.5 |
|  |  | 40 | −1.6 | −4.3 | 0.3 | 1.0 |
|  |  | 80 | −1.7 | −4.4 | −1.0 | 0.1 |
|  | 7 | 15 | −1.2 | — | −0.4 | — |
|  |  | 40 | −1.9 | −4.1 | −0.7 | −0.9 |
|  |  | 80 | −1.8 | −3.4 | −1.1 | −1.0 |
| 240 | 1 | 15 | −0.1 | −0.6 | −0.3 | −1.3 |
|  |  | 40 | −0.7 | −3.4 | −0.7 | −1.0 |
|  |  | 80 | −1.9 | −3.4 | 0.2 | 0.4 |
|  | 4 | 15 | −0.6 | −2.8 | −0.6 | −0.6 |
|  |  | 40 | −0.4 | −3.4 | −0.9 | 0.1 |
|  |  | 80 | −4.6 | −6.1 | −0.6 | −0.7 |
|  | 7 | 15 | −0.4 | — | 1.6 | — |
|  |  | 40 | −1.2 | −4.3 | 0.8 | 0.4 |
|  |  | 80 | −2.7 | −4.7 | −1.0 | 1.2 |

In Table 13 a summary of the results is shown.

Table 13.

Effect of blanching and electrical treatment on the fresh weight and dry matter content of potato strips.

| Variable |  | Changes in fresh weight, % common | electrical | Changes in dry matter, per cent units common | electrical |
|---|---|---|---|---|---|
| Time, | 60 sec. | −0.9 | −2.1 | −0.4 | −0.1 |
|  | 120 sec. | −1.5 | −3.7 | −0.6 | −0.1 |
|  | 240 sec. | −1.4 | −3.7 | −0.5 | −0.2 |
| Current, | 1 ampere | −0.9 | −2.4 | −0.4 | −0.3 |
|  | 4 ampere | −1.5 | −3.4 | −0.6 | 0.0 |
|  | 7 ampere | −1.4 | −3.6 | −0.5 | −0.1 |
| Temperature, | 15° C | −0.6 | −1.7 | −0.2 | −0.4 |
|  | 40° C | −0.8 | −3.0 | −0.4 | 0.0 |
|  | 80° C | −2.6 | −3.8 | −0.6 | 0.1 |

As can be seen in Tables 12 and 13 the treatments both reduced the fresh weight, especially the electrical treatment. Also the dry matter content was affected and decreased mostly by the common blanching. Increasing the time of treatment, the amperages and the temperature increases the effect of the treatment on the fresh weight and the dry matter content.

Experiment 9.

The purpose was to study the effect of blanching and electrical treatment on the quality of French fries. The following experimental plan was used.

Time of treatment: 120 and 240 sec.
Temperature: 15° and 40° C
Amperage: 4 A
Frying time: 390 sec.
The results are given in Table 14.

Table 14.

Effect of blanching and electrical treatment on the quality of French fries.

| Property | 120 sec. 15° C | | | 120 sec. 40° C | | | 240 sec. 15° C | | | 240 sec. 40° C | | |
|---|---|---|---|---|---|---|---|---|---|---|---|---|
|  | A | B | C | A | B | C | A | B | C | A | B | C |
| Colour (1–9) | 5 | 5 | 9 | 5 | 5 | 9 | 5 | 5 | 9 | 5 | 5 | 9 |
| Blisters (1–3) | 2 | 3 | 3 | 3 | 3 | 3 | 2 | 2 | 3 | 3 | 2 | 3 |
| Taste (1–3) | 3 | 3 | 3 | 3 | 3 | 3 | 3 | 3 | 3 | 3 | 3 | 3 |
| Odour (1–3) | 3 | 3 | 3 | 3 | 3 | 3 | 3 | 3 | 3 | 3 | 3 | 3 |

A = Control
B = Common
C = Electrical

As can be seen in Table 14 the electrical treatment improved the color of the French fried potatoes markedly.

Experiment 10.

The purpose was to study the effect of blanching and electrical treatment on the dry matter content of strips from potatoes. The following experimental plan was used.

Time of treatment: 60, 120 and 240 sec.
Temperature: 15°, 40° and 70° C
Amperage: 1, 3, 5 and 7 A
Number of combinations: 36
Weight of sample: 10 g
The results of the experiment are given in Table 15.

Table 15.

Effect of blanching and electrical treatment on the dry matter content of potato chips.

| Time Sec. | Amperes | Temperature, °C | Dry matter, % A | B | C | Dry matter, g/10 g A | B | C |
|---|---|---|---|---|---|---|---|---|
| 60 | 1 | 15 | 16.3 | 15.1 | 15.5 | 1.6 | 1.5 | 1.6 |
|  |  | 40 | 16.4 | 15.4 | 15.3 | 1.6 | 1.5 | 1.5 |
|  |  | 70 | 16.4 | 16.7 | 16.8 | 1.6 | 1.7 | 1.6 |
|  | 3 | 15 | 17.3 | 18.2 | 15.2 | 1.7 | 1.8 | 1.5 |
|  |  | 40 | 17.3 | 16.4 | 16.8 | 1.7 | 1.6 | 1.7 |
|  |  | 70 | 18.1 | 15.8 | 15.4 | 1.8 | 1.6 | 1.5 |
|  | 5 | 15 | 16.7 | 16.9 | 16.6 | 1.7 | 1.7 | 1.7 |
|  |  | 40 | 17.5 | 16.7 | 15.7 | 1.8 | 1.7 | 1.6 |
|  |  | 70 | 17.1 | 17.8 | 17.0 | 1.7 | 1.8 | 1.7 |
|  | 7 | 15 | — | — | — | — | — | — |
|  |  | 40 | 16.6 | 17.1 | 17.3 | 1.7 | 1.7 | 1.7 |
|  |  | 70 | 16.1 | 16.4 | 17.6 | 1.7 | 1.6 | 1.7 |
| 120 | 1 | 15 | 17.4 | 16.7 | 16.2 | 1.7 | 1.7 | 1.6 |
|  |  | 40 | 16.4 | 16.7 | 16.7 | 1.6 | 1.7 | 1.7 |
|  |  | 70 | 16.0 | 16.4 | 15.2 | 1.6 | 1.6 | 1.5 |
|  | 3 | 15 | 17.6 | 15.7 | 16.9 | 1.8 | 1.6 | 1.7 |
|  |  | 40 | 15.7 | 16.2 | 17.5 | 1.6 | 1.6 | 1.7 |
|  |  | 70 | 15.2 | 15.3 | 16.1 | 1.5 | 1.5 | 1.5 |
|  | 5 | 15 | 18.8 | 17.7 | 18.2 | 1.9 | 1.8 | 1.8 |
|  |  | 40 | 15.7 | 14.9 | 16.0 | 1.6 | 1.5 | 1.5 |
|  |  | 70 | 15.6 | 15.4 | 15.6 | 1.6 | 1.5 | 1.5 |
|  | 7 | 15 | — | — | — | — | — | — |
|  |  | 40 | 15.5 | 14.6 | 14.9 | 1.6 | 1.5 | 1.4 |
|  |  | 70 | 15.7 | 16.0 | 16.1 | 1.6 | 1.6 | 1.5 |
| 240 | 1 | 15 | 14.4 | 14.8 | 13.1 | 1.4 | 1.5 | 1.3 |
|  |  | 40 | 15.1 | 15.3 | 15.2 | 1.5 | 1.6 | 1.5 |
|  |  | 70 | 15.9 | 16.4 | 14.9 | 1.6 | 1.6 | 1.4 |
|  | 3 | 15 | 15.3 | 15.2 | 14.6 | 1.5 | 1.5 | 1.4 |
|  |  | 40 | 16.2 | 15.3 | 15.6 | 1.6 | 1.6 | 1.5 |
|  |  | 70 | 14.3 | 14.6 | 15.3 | 1.4 | 1.4 | 1.4 |
|  | 5 | 15 | 15.5 | 15.6 | 16.5 | 1.6 | 1.6 | 1.6 |
|  |  | 40 | 17.1 | 16.2 | 16.6 | 1.7 | 1.6 | 1.6 |
|  |  | 70 | 17.4 | 15.5 | 17.0 | 1.7 | 1.6 | 1.6 |
|  | 7 | 15 | — | — | — | — | — | — |
|  |  | 40 | 14.9 | 14.4 | 14.5 | 1.5 | 1.4 | 1.4 |
|  |  | 70 | 16.0 | 14.9 | 15.2 | 1.6 | 1.4 | 1.4 |

A = Control
B = Common
C = Electrical

In Table 16 the differences between the treatments and the control have been calculated.

Table 16.

Effect of blanching and electrical treatment on the content of dry matter in strips of potatoes.

| Variable |  | Difference in dry matter content, % control-common | control-electrical | common-electrical |
|---|---|---|---|---|
| Time, | 60 sec. | 1.8 | 4.7 | 3.0 |
|  | 120 sec. | 2.5 | 3.1 | 0.6 |
|  | 240 sec. | 2.6 | 5.8 | 3.2 |
| Temperature, | 15° C | 1.8 | 4.8 | 3.0 |
|  | 40° C | 1.9 | 3.7 | 1.8 |
|  | 70° C | 2.4 | 5.0 | 2.6 |
| Amperages, | 1 A | 0.6 | 5.0 | 4.4 |
|  | 3 A | 3.1 | 4.2 | 1.1 |
|  | 5 A | 3.0 | 4.8 | 1.8 |
|  | 7 A | 1.9 | 3.8 | 1.9 |

As can be seen in Tables 15 and 16 blanching decreased the dry matter content and the electrical treatment showed a higher loss of dry matter than the common blanching.

Experiment 11.

The purpose was to study the effect of blanching and electrical treatment on the fresh weight of cuts and on the yield and quality of French fries. The following experimental plan was used.

Time of treatment: 60 and 240 sec.
Amperage: 3 and 7 A
Temperature: 15°, 40° and 70° C
Samples per treatment: 2
Weight of sample: 10 g The results are given in Table 17.

Table 17.

Effect of blanching and electrical treatment on the fresh weight of strips, yield and quality of French fries.

| Time, sec. | Amperes | Temperature, °C | Changes in fresh weight, % B | C | Yield, % A | B | C | Colour (1–9) A | B | C |
|---|---|---|---|---|---|---|---|---|---|---|
| 60 | 3 | 15 | 0.2 | 0.0 | 48 | 50 | 53 | 1 | 1 | 1 |
|  |  | 40 | −0.1 | −0.3 | 51 | 50 | 51 | 1 | 1 | 2 |
|  |  | 70 | −0.1 | −0.2 | 52 | 52 | 50 | 2 | 4 | 3 |
|  | 7 | 15 | — | — | — | — | — | — | — | — |
|  |  | 40 | −0.1 | −0.4 | 53 | 53 | 51 | 1 | 4 | 4 |
|  |  | 70 | −0.1 | −0.4 | 51 | 55 | 51 | 1 | 2 | 3 |
| 240 | 3 | 15 | 0.2 | 0.0 | 48 | 52 | 51 | 1 | 1 | 2 |
|  |  | 40 | 0.1 | −0.6 | 50 | 51 | 51 | 1 | 3 | 4 |

Table 17.-continued

Effect of blanching and electrical treatment on the fresh weight of strips, yield and quality of French fries.

| Time, sec. | Amperes | Temperature, °C | Changes in fresh weight, % | | Yield, % | | | Colour (1–9) | | |
|---|---|---|---|---|---|---|---|---|---|---|
| | | | B | C | A | B | C | A | B | C |
| | 7 | 70 | 0.0 | −0.6 | 54 | 52 | 51 | 3 | 4 | 5 |
| | | 15 | — | — | — | — | — | — | — | — |
| | | 40 | 0.1 | −0.8 | 51 | 52 | 48 | 1 | 3 | 4 |
| | | 70 | −0.2 | −0.6 | 50 | 55 | 51 | 2 | 4 | 5 |

A = Control
B = Common
C = Electrical

As can be seen in Table 16 the electrical treatment of the strips decreased the fresh weight of the strips and improved mostly the color of the French fries compared with the common blanching.

Experiment 12.

The purpose was to study the effect of the blanching and electrical treatment on the fresh weight and dry matter content of cuts from potatoes. The samples were larger in this experiment than in Experiment 11. The following experimental plan was used.

Time of Treatment: 60 and 240 sec.
Amperage: 3 A
Temperature: 15°, 40° and 70° C
Weight of sample: 90 g
Samples per treatment: 2
The results are given in Table 18.

Table 18.

Effect of blanching and electrical treatment on the fresh weight and dry matter content of potato strips.

| Time, Sec. | Amperes | Temperature, °C | Changes in fresh weight % | | Dry matter content, % | | |
|---|---|---|---|---|---|---|---|
| | | | B | C | A | B | C |
| 60 | 3 | 15 | −1.4 | −1.5 | 16.8 | 16.8 | 16.1 |
| | | 40 | −1.0 | −2.7 | 17.3 | 17.5 | 16.1 |
| | | 70 | −1.7 | −5.1 | 16.0 | 14.7 | 14.7 |
| 240 | 3 | 15 | −0.6 | −6.5 | 16.8 | 17.8 | 17.1 |
| | | 40 | −0.9 | −5.6 | 15.8 | 16.6 | 15.9 |
| | | 70 | −2.5 | −6.9 | 16.0 | 17.1 | 15.0 |

A = Control
B = Common
C = Electrical

As can be seen in Table 17 the treatments decreased the fresh weight but especially the electrical treatment caused a large decrease. The loss in fresh weight also seemed to be accompanied by a decrease in dry matter content. On comparing the results from Experiments 11 and 12 it is evident that the larger samples in Experiment 12 contributed to the larger decrease in fresh weight.

Experiment 13.

The purpose was to study the effect of the treatments of potato strips on the fresh weight, yield and quality of French fries. The following experimental plan was used.

Time of treatment: 60 and 240 sec.
Amperage 3 and 7 A
Temperature: 15°, 40° and 70° C
Weight of sample: 180 g
Samples per treatment: 2
The results are given in Table 19.

Table 19.

Effect of blanching and electrical treatment on the fresh weight, yield and color of French fries.

| Time, sec. | Amperes | Temperature, °C | Changes in fresh weight, % | | Yield, % | | | Colour (1–9) | | |
|---|---|---|---|---|---|---|---|---|---|---|
| | | | B | C | A | B | C | A | B | C |
| 60 | 3 | 15 | −0.7 | −2.1 | 56 | 56 | 56 | 1 | 2 | 3 |
| | | 40 | −1.0 | −2.0 | 56 | 58 | 57 | 1 | 2 | 3 |
| | | 70 | −1.2 | −1.5 | 58 | 56 | 59 | 1 | 4 | 5 |
| | 7 | 15 | — | — | — | — | — | — | — | — |
| | | 40 | −0.4 | −4.1 | 56 | 57 | 56 | 1 | 1 | 2 |
| | | 70 | −2.3 | −3.6 | 60 | 55 | 58 | 3 | 4 | 5 |
| 240 | 3 | 15 | −2.3 | −0.9 | 55 | 56 | 55 | 1 | 3 | 2 |
| | | 40 | −1.0 | −2.0 | 56 | 55 | 57 | 2 | 2 | 3 |
| | | 70 | −1.9 | −4.3 | 58 | 58 | 57 | 1 | 4 | 6 |
| | 7 | 15 | — | — | — | — | — | — | — | — |
| | | 40 | 1.6 | −2.7 | 56 | 58 | 57 | 1 | 3 | 4 |
| | | 70 | 1.1 | −4.1 | 59 | 60 | 57 | 1 | 5 | 6 |

As can be seen in Table 18 the electrical treatment lowered the fresh weight and improve the color as compared with the common blanching.

A defect which causes problems in chips is blistering, about which very little is known. The results from experiments with OSCO-blanching indicate that this method of blanching reduces the blistering (Table 19A).

Table 19A.

| | Influences of blanching on blistering. | |
|---|---|---|
| Temperature, °C | Blisters, per cent of surface area | |
| | Water | OSCO |
| 12 | 77 | 6 |
| 48 | 17 | 12 |
| 80 | 11 | 7 |

The results from this investigation of blanching show that OSCO-blanching is an interesting alternative for blanching potato slices and strips. The effect of blanching seems to increase per time unit which means that the time for blanching could be cut down. It is of course impossible to give any final judgment on the value of OSCO-blanching for the processing industry but the results obtained will stimulate new efforts in developing the OSCO-method of blanching.

SUMMARY

Using blanching or electrical treatment of strips for French fries a decrease in fresh weight is common. This decrease is larger when the electrical treatment is used. The two treatments also seen to cause a loss of dry matter, which also is higher for the electrical treatment. The improvement of the color following the treatments seems to be better for the electrical treatments, while practically no difference between the two methods in yield could be shown.

The experiments undertaken with rather simple equipment and with potatoes high in sugar showed that the effect of a blanching could be affected by using an alternating electrical current running through the blanching water. It is also evident that the two treatments acted in a different way on the slices and strips investigated. The common blanching affected the surface of the slices and strips while the electrical treament affected the whole slice and strip. This could be seen when working with slices high in sugar. On blanching those in warm water during a long period of time only the surface became light when the slices were fried, but inside the chips were still brown. Treating the same type of slices electrically the color was light throughout the chips. It is evident that the electrical treatment affects the membranes in the cells thereby increasing the leaching of water and substances. It seems therefore possible to shorten the time required to reach a light color by means of the electrical treatment. These experiments have shown that the electrical treatment has many applications in the blanching technique and by means of this electrical treatment the effect of blanching can be modified in different ways.

What is claimed is:

1. In a method of preparing deep-fried potato products comprising the steps of (a) blanching the uncooked potato pieces, including washing and preheating the potato pieces prior to cooking, and (b) deep frying the thus-treated potatoes, the improvement comprising passing an electric current of about 50 – 60 cycles per second directly through the potato pieces during the blanching step (a).

2. The method of claim 1 wherein the potato pieces are heated during the passage of the electric current to sterilization temperature.

3. The method of claim 1 wherein the potato pieces are subjected to a voltage potential in water of between 0.2 and 20 volts/mm.

4. The method of claim 3 wherein the voltage potential is about 1.5 volts/mm.

* * * * *